United States Patent

[11] 3,602,240

[72] Inventors Jeffrey N. Shinn
Scotia;
Thomas H. Vogelsang, Schenectady, both of, N.Y.
[21] Appl. No. 17,786
[22] Filed Mar. 9, 1970
[45] Patented Aug. 31, 1971
[73] Assignee General Electric Co.

[54] TEMPERATURE-COMPENSATING FLUIDIC REFERENCE CIRCUIT
10 Claims, 5 Drawing Figs.
[52] U.S. Cl. .................................................. 137/81.5
[51] Int. Cl. .................................................. F15c 4/00
[50] Field of Search .......................................... 137/81.5, 12, 13, 14

[56] References Cited
UNITED STATES PATENTS
3,314,294 4/1967 Colston .................... 137/81.5 X
3,465,775 9/1969 Rose ........................... 137/81.5
3,504,691 4/1970 Campagnuolo et al. ...... 137/81.5

Primary Examiner—William R. Cline
Attorneys—Frank L. Neuhauser, Oscar B. Waddell, Joseph B. Forman, Arthur Fournier, Jr. and David M. Schiller ABSTRACT: A passive fluidic reference circuit includes at least a first fluid flow restrictor connected between a pneumatic supply pressure source $P_s$ and the circuit output $P_r$, and second restrictor connected between the circuit output and a vent. The first and second restrictors are of types which obtain pressure drops thereacross varying with absolute temperature $T$ as the functions $P_s-P_r=K_1T^y\omega$ and $P_r=K_2T^z\omega$, respectively. Operation of the passive circuit and a temperature-sensitive fluidic circuit whose output pressure signal $P_o$ varies with temperature as $(P_o/P_s)=(K_a/T^x)$ is made essentially insensitive to temperature changes for the conditions $x=y=z$ and $(K_2/K_1)=K_a$ which establishes a reference operating point $P_o=P_r$.

INVENTORS:
JEFFREY N. SHINN;
THOMAS H. VOGELSANG, by Louis A. Moucha

TEMPERATURE-COMPENSATING FLUIDIC REFERENCE CIRCUIT

TEMPERATURE-COMPENSATING FLUIDIC REFERENCE CIRCUIT

The invention herein described was made in the course of or under a contract with the Department of the Air Force.

Our invention relates to a passive fluidic reference circuit adapted for use in a fluidic control system, and in particular, to a passive circuit having a predetermined temperature sensitivity corresponding to that of a second fluidic circuit associated therewith to thereby obtain operation of the two circuits insensitive to temperature changes.

Fluid amplifiers having no moving mechanical parts and fluidic circuitry embodying such devices have several advantages over similar electronic devices and circuits in that the fluidic version is inherently better adapted for operation under extreme environmental conditions of high temperature, nuclear radiation, shock, etc. However, the full capabilities of fluidic circuitry have not been achieved in applications of circuit operation over a wide temperature range of the environment since the operating characteristics of specific fluidic circuitry are known to change therewith, thereby degrading the accuracy of the system containing such circuitry. As an example, a variation in the temperature of the environment of fluidic circuitry in an aircraft speed control system in the order of 1,200° F. or more is not unusual.

Control systems generally utilize a reference circuit for establishing a reference point about which the control system operates and regulates to maintain a specific monitored parameter at a desired value corresponding to the reference point. Thus, in a speed control system, a reference circuit establishes the desired operating speed (set point), and the control system regulates the monitored (actual) speed about such reference speed. In the particular case of a fluidic speed control system, a fluidic reference circuit establishes a fluid pressure corresponding to a desired operating speed, and this reference pressure is compared with a pressure signal representing the monitored speed for developing an error signal utilized by the control system for correcting the monitored speed to the desired speed. The fluidic circuitry developing the pressure signal representing the actual system speed is generally temperature sensitive due primarily to fluid-reactive elements and resistive effects included therein. The more widely used fluidic reactive elements are the fluidic capacitors and the most common resistive effects are the inherent restrictions exhibited by the control ports and output receivers of the fluid amplifier devices. A typical temperature-sensitive fluidic circuit is the frequency-to-analog converter illustrated in U.S. Pat. No. 3,409,032 to Boothe et al. and assigned to the assignee of the present invention. It is thus evident that compensation for the temperature sensitivity of specific fluidic circuits is desirable, and in many cases necessary, in order to utilize the full capabilities of fluid amplifiers.

Temperature compensation in prior art fluidic circuits has been produced by generating the reference pressure from a frequency reference signal developed from an oscillating metallic torsional reed and processing the frequency signal through a fluidic frequency-to-analog converter circuit identical with another such circuit in the control system whereby the two identical and parallel connected frequency-to-analog converter circuits had identical temperature sensitivity. Although this parallel circuit approach provides temperature insensitivity at the reference point, the accuracy of such approach depends on the degree of stability of the frequency signal generated by the torsional reed which may not be sufficient in control systems operating over a wide temperature range (since no metal has a constant modulus of elasticity over a temperature range such as 0–1,200° F.), and is obviously expensive in both money and space occupied by such additional circuitry.

Therefore, one of the principal objects of our invention is to provide a temperature-compensating fluidic reference circuit to obtain accurate operation of a fluidic system having another temperature-sensitive fluidic circuit therein.

Another object of our invention is to provide the reference circuit with a temperature sensitivity equal to that of the other circuit whereby the pressure at the outputs of the two circuits vary with temperature in the same manner.

Briefly stated, we provide a passive fluidic reference circuit which includes at lease a first fluid flow restrictor connected at an input end thereof to a pneumatic supply pressure, $P_s$, providing a reference pressure, $P_r$, at the output end thereof, and obtaining a pressure drop thereacross varying with absolute temperature as the function $P_s - P_r = K_1 T^y \omega$. The reference circuit is completed by at least a second fluid flow restrictor connected at an input end thereof to the output end of the first restrictor and being vented at the output end thereof, and obtaining a pressure drop thereacross varying with absolute temperature as the function $P_r = K_2 T^z \omega$ where $K_1$ and $K_2$ here are defined as flow resistance coefficients of the restrictors and $\omega$ is the weight flow rate of the pneumatic medium through the restrictors. In the case of a temperature-sensitive fluidic circuit in a fluidic control system whose output pressure signal $P_o$ typically varies with absolute temperature as the function $P_o/P_s = K_a/T^x$, $P_o$ and $P_r$ will vary with temperature in the same manner for the two conditions $x=y-z$ and $K_2/K_1=k_a$ to provide operation of the two circuits about a reference point defined by $P_o=P_r$ which is insensitive to temperature changes. The first and second restrictor types may vary from the orifice flow to the fully laminar flow as determined by the two conditions.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings, wherein like parts in each of the several figures are identified by the same reference character, and wherein:

Figure 1:
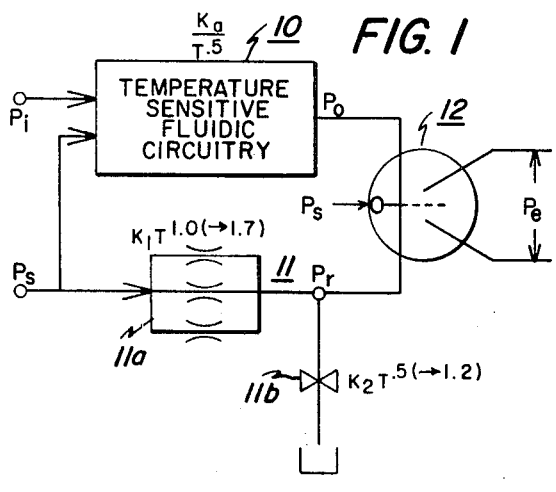
FIG. 1 is a combined block and schematic diagram of a portion of a typical fluidic control system including a specific embodiment of our temperature-compensating fluidic reference circuit.

Referring now to FIG. 1, there is shown the error-sensing part of a typical fluidic control system which may be of the open or closed loop type. The input pressure signal $p_i$ to fluidic circuit 10 may be either analog or digital and represents a parameter (or a known function thereof) being controlled in the case of an open-loop system, but is in a form not readily adapted for use in the error detection circuit 12. Input signal $p_i$ is thus processed in a circuit 10 to provide at the output thereof, an output pressure signal $P_o$, of appropriate analog or digital form, representing the controlled parameter. As an example, in a speed control system, signal $p_i$ may be a pulsating pressure signal of variable magnitude wherein the pulsation frequency is directly proportional to actual engine speed, fluidic circuit 10 includes the aforementioned frequency-to-analog converter, and signal $P_o$ is of substantially constant magnitude directly proportional to the frequency of $P_i$, and thus directly proportional to the controlled parameter, actual engine speed.

Reference pressure $P_r$ at the output of circuit 11 represents a desired reference point (reference speed in the case of the speed control system) about which the controlled parameter (represented by $P_o$) is to operate, and any difference between pressure levels $P_r$ and $P_o$ is sensed in fluidic error detection circuit 12 and indicated at the output thereof as an error signal $P_e$ whose pressure magnitude and polarity defines the error. For simplification purposes, circuit 12 is illustrated as a single stage analog-type fluid amplifier, but in many applications would include a plurality of serially connected stages forming either a high gain fluidic gain block or, when utilized with negative feedback, a fluidic operational amplifier, for summing $p_o$ and $P_r$ and amplifying error signal $P_e$ for further processing thereof in another part of the control system (not shown). The fluid utilized in the various circuits 10, 11, 12 is a pneumatic medium such as air or any other suitable gas.

In the idealized case wherein fluidic circuit 10 is temperature insensitive, the fluidic reference circuit 11 merely comprises a pair of similar-type fluid flow restrictors connected across a pneumatic supply pressure $P_s$. The reference pressure would be the pressure level existing at the juncture of the restrictors and would also be temperature insensitive since the pressure drops across the restrictors vary with temperature in the same manner.

However, ideal temperature-insensitive fluidic circuit 10 of the type which process a system parameter rarely, if ever, exist. Thus, circuit 10 which may be of the analog or digital type, or combination thereof, exhibits a temperature sensitivity (i.e. $P_o$ varies with temperature, all other variables being held constant) that can be determined. Circuit 10, in general, includes at least one fluid amplifier device, and in the case of the aforementioned frequency-to-analog converter, output pressure signal $P_o$ varies with absolute temperature T as the function $P_o/P_{as}=K_a/T^{0.5}$ where $K_a$ is the constant gain component of the mathematical function relating $P_o$ to $P_s$, it being known that the output pressure $P_o$ level in a fluid amplifier circuit increases as the (power fluid) supply pressure $P_s$ thereto increases. It is assumed herein that the same pneumatic supply pressure $P_s$ is supplied to circuit 12 being independent of the following mathematical considerations. However, the mathematical approach can include the effect of unequal pressure $P_s$ to circuits 10 and 11 with no difficulty as will be apparent hereinafter.

It can be appreciated in the idea circuit wherein no element is temperature sensitive, that pressure levels $P_o$ and $P_r$ will not vary with temperature changes and thus will track perfectly over a wide temperature range to provide the maximum accuracy as determined by the complete system open or closed-loop gain. However, in the more realistic case, temperature-sensitive fluidic circuit 10, when interconnected with reference circuit 11 in the manner illustrated in FIG. 1, degrades the system accuracy with any appreciable change in the temperature of the environment of circuits 10 and 11. This decrease in system accuracy occurs because pressure $P_o$ will change in one manner with the change in temperature whereas pressure $P_r$ remain constant if temperature insensitive, or vary in a different manner with temperature, in general, from that of $P_o$. As a result, the desired relationship of $P_o=P_r$ at the desired system operating point will occur at only one temperature, and deviation of environmental temperature therefrom will produce an incorrect value of the controlled parameter corresponding to the desired reference value determined by $P_r$.

In order to maintain the desired accuracy of system operation over a temperature range in the order of 1,200° F., or greater, the reference pressure $P_r$ and controlled parameter signal pressure $P_o$ (the two pressures summed in amplifier 12) must vary with temperature in the same manner so that the reference point of the control will be insensitive to temperature changes. In accordance with our invention, we provide a passive fluidic reference circuit 11 which has a temperature sensitivity which tracks that of circuit 10 as closely as dictated by the required accuracy of the particular control system.

A temperature-compensating fluidic reference circuit 11 will now be developed in accordance with our invention for the specific application wherein fluidic circuit 10 is the hereinabove mentioned frequency-to-analog converter having an output pressure signal $P_0$ varying with absolute temperature T as the function:

$$P_o/P_s = K_a/T^{0.5} \qquad (1)$$

where $K_a$ is a constant gain coefficient. Initially, it will be assumed that our passive fluidic reference circuit 11 consists of a single upstream fluid flow restrictor 11a connected between pneumatic supply pressure source $P_s$ and the reference circuit output designated $P_r$, and a second downstream restrictor 11b connected between the circuit output and a vent. It will also be initially assumed that restrictor 11b is of the orifice type, that is, develops a turbulent flow therethrough. It is known that the pneumatic pressure drop across an orifice-type (i.e. square law type) restrictor varies with absolute temperature as $K_2T^{0.5}\omega$ where $K_2$ is a flow resistance coefficient of the restrictor and $\omega$ is the weight flow rate of the gaseous medium through the restrictor. This relationship can be developed from Bernoulli's equation for incompressible flow (since low-pressure gases and small-pressure changes are assumed in the operation of our invention) to obtain the square-law relationship $\Delta P=\omega^2/A^2 \ RT/2gP_a$ where $\Delta P$ is the pressure drop across the orifice restrictor, A is the cross sectional area of the orifice, R is the gas constant and $P_a$ is the absolute pressure at the exhaust of the orifice. The fluidic dynamic resistance "r" of a restrictor may be defined in partial differential equation form as $$r = \frac{\partial(\Delta P)}{\partial \omega}$$

whereby for an orifice the resistance becomes $$r_0 = \frac{2}{A}\left(\frac{RT\Delta P_c}{2gP_a}\right)^{.5}$$

where g is the gravity constant, $\Delta P_c$ is the average pressure drop across the restrictor at the desired system operating point, and $P_a$ is the absolute pressure at the orifice exhaust. For the conditions where R, g, $P_a$, A and $\Delta P_c$ are approximately constant, $r_o=K_2T^{0.5}$ and $\Delta P=K_2T^{0.5}\omega$. The flow resistance coefficient $$K_2 = \frac{2}{A}\left(\frac{R\Delta P_c}{2gP_a}\right)^{.5}$$

is thus indirectly related to the orifice area, and the pressure drop across orifice restrictor 11b can thus be defined as:

$$P_r = K_2 T^{0.5} \omega 1 \qquad (2)$$

The pressure drop across unknown restrictor 11a is defined as:

$$P_s - P_r = K_1 T^y \omega_2 \qquad (3)$$

Since the supply pressure $P_s$ is impressed across the series arrangement of restrictors 11a and 11b, and assuming the flow to the control port of amplifier 12 is small whereby weight flow rate $\omega_1$ is approximately equal to $\omega_2$, the following expression can be obtained from equations (2) and (3):

$$\frac{P_r}{P_s} = \frac{K_2 T^{.5}}{K_1 T^y + K_2 T^{.5}} \qquad (4)$$

The expression $$\frac{P_r}{P_s}$$

can be reduced to:

$$\frac{P_r}{P_s} = \frac{1}{\frac{K_1}{K_2}T^{(y-.5)}+1} \qquad (5)$$

and it can be seen that for the usual case wherein T is in the order of 400 to 1,000 and $K_1$ and $K_2$ are of the same order of magnitude:

$$K_1/K_2 T(y-0.5) > BS1.0 \quad (6)$$

whereby $P_r/P_s$ simplifies to the gain function approximation:

$$\frac{P_r}{P_s} \simeq \frac{K_2/K_1}{T^{(y-.5)}} \quad (7)$$

It is evident that the relationships $P_o/P_s$ and $P_r/P_s$ are equated for the two conditions $K_a = K_2/K_1$ $y=1.0$. It is also known that the pressure drop across a fully laminar restrictor, which may be defined as one in which the viscous effects of flow predominate over inertial effects, varies with absolute temperature as $K_1 T^{1.7} \omega$ for air where $K_1$ is a flow resistance coefficient. This relationship can be developed from Poiseuille's equation to obtain the linear relationship $$\Delta P = \frac{32 \mu l \omega}{A d^2} \frac{RT}{P_a}$$

where $\mu$ is the gas viscosity, $l$ is the channel length of the restrictor, $A$ is the channel cross-sectional area, $d$ is the hydraulic diameter (4A/wetted perimeter) and $P_a$ is the gas pressure. From the hereinabove definition for fluidic resistance, the dynamic resistance for a laminar restrictor becomes $$r_l = \frac{32 \mu l}{A d^2} \frac{RT}{P_a}$$

Again, for the conditions where $\mu, l, A, d, R$ and $P_a$ are approximately constant, and for air, $\mu = KT^{0.71}$, $r_l = K_1 T^{1.71}$ and $\Delta P = K_1 T^{1.71} \omega$. The flow resistance coefficient $K_1$ is thus directly related to the viscosity and channel length and indirectly related to the channel hydraulic diameter squared and the channel cross-sectional area. Since the required pressure-temperature characteristics for restrictor 11a is $K_1 T^{1.0}$, it is evident that restrictor 11a is of a type intermediate the orifice and fully laminar, that is, the length to hydraulic diameter of such restrictor is less than that of a fully laminar restrictor. The two required conditions for establishing a temperature-insensitive reference operating point $P_o = P_r$ about which the controlled parameter $P_o$ operates are thus $K_a = K_2/K_1$ and the equality of the temperature $T$ exponents. These two conditions are fulfilled by (1) determining the temperature sensitivity of fluidic circuit 10 by measuring the variation of $P_o$ with $T$ for a constant input $P_i$, thereby determining the value of constant $K_a$ and the exponent $x$ of $T^x$ (which is 0.5 for the particular hereinabove frequency-to-analog converter circuit) (2) from the $T^{0.5}$ determined above, the difference between the exponents of $T$ for restrictors 11a and 11b is established as 0.5 (3) choose restrictor 11b type as an orifice ($K_2 T^{0.5}$) as a first choice for simplicity whereby restrictor 11a type is established as a somewhat laminar type ($K_1 T^{1.0}$) in order to satisfy the second condition (of $T$ exponents) of $y=1.0$ for the above frequency-to-analog converter and (4) determine the dimensions of restrictors 11a and 11b to satisfy the first condition $K_a = K_2/K_1$.

The second condition (of the $T$ exponents) is implicitly satisfied once the temperature sensitivity of fluidic circuit 10 is known, since this establishes the difference between the temperature exponents of restrictors 11a and 11b. Upon the second condition being satisfied, the reference pressure $P_r$ should theoretically have a temperature sensitivity curve which is parallel with that of $P_o$ when plotted therewith on a log-log scale. The first condition ($K_a = K_2/K_1$) is not as readily satisfied as the second condition since it involves the determination of the specific dimensions of restrictors 11a and 11b while maintaining such restrictors of the types necessary to satisfy the second condition (maintaining constant degree of laminarity, i.e. $\Delta P = K_1 T^y$ where $y$ is constant). Upon the first condition also being satisfied, the two plotted temperature-sensitive curves should theoretically be superimposed (i.e., reference pressure $P_r$ has the same temperature sensitivity as the circuit 10 output). In actual practice, a perfect tracking of the curves is not attained since the degree of laminarity is also a function of the pressure drop across laminar restrictor 11a, which varies with temperature, and therefore the degree of laminarity changes with temperature.

Figure 2:
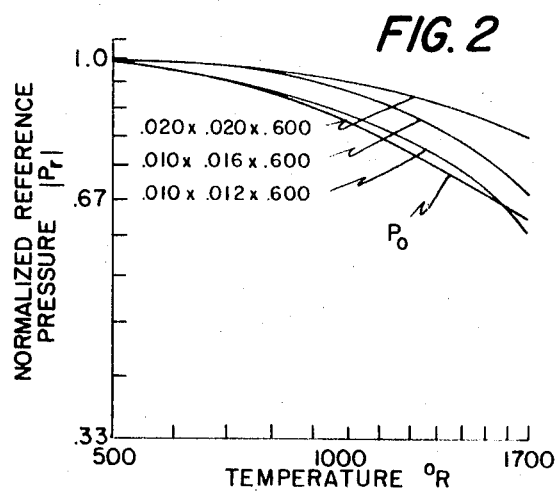
FIG. 2 is a log-log graphical representation of a family of curves illustrating the variation of reference pressure with absolute temperature for various upstream laminar restrictors having different degrees of laminarity.

The effect on the temperature sensitivity of reference pressure $P_r$ produced by varying the degree of laminarity of restrictor 11a is illustrated in the family of curves of FIG. 2. The curves were obtained for the condition of restrictor 11b having a constant orifice diameter of 0.025 inch and a constant supply pressure $P_s$ of 10 p.s.i.g. The graph ordinate represents reference pressure $P_r$ normalized to obtain a value of 1.0 at temperature $T=500°$ R. for each of three different laminar restrictors being tested. The three restrictors are each of 0.600-inch length and have various hydraulic diameters determined by the first two dimensions, in inches, indicated on FIG. 2. The curves plotted on log-log scales show that as the restrictor becomes less laminar (by increasing the height or width of the hydraulic diameter dimensions) there is less change in the reference pressure with temperature. The graph also shows a typical frequency-to-analog converter output pressure change with temperature and is designated as curve $P_o$. It is evident that the most laminar (0.010×0.012×0.600) of the three restrictors most closely matches the $P_o$ curve. Thus, a simple restrictor network consisting of a 0.010×0.012× 0.600-inch partially laminar-type restrictor 11a and a 0.025-inch orifice-type restrictor 11b may be utilized as temperature-compensating fluidic reference circuit in the case wherein the output of fluidic circuit 10 has a temperature sensitivity of $K_a/T^{0.5}$. Although this reference circuit utilizes a partially laminar restrictor 11a having an approximate temperature sensitivity of $K_1 T^{1.0}$ and an orifice restrictor 11b having temperature sensitivity of $K_2 T^{0.5}$, it should be evident from the derived equations that restrictor 11a can be made more laminar and even be fully laminar while simultaneously making restrictor 11b somewhat laminar to maintain the difference of the temperature exponents of restrictors 11a and 11b at 0.5. Thus, in the extreme case, restrictor 11a may be fully laminar whereby $x=1.7$, and under such condition restrictor 11b has a temperature sensitivity of $K_2 T^{1.2}$. This variation in the restrictor temperature exponents is indicated in FIG. 1 in the parenthesis. However, it should be understood that equal change of the temperature exponents of restrictors 11a and 11b will not, in general, result in the same temperature sensitivity curve as will hereinafter be described with reference to FIG. 3.

Figure 3:
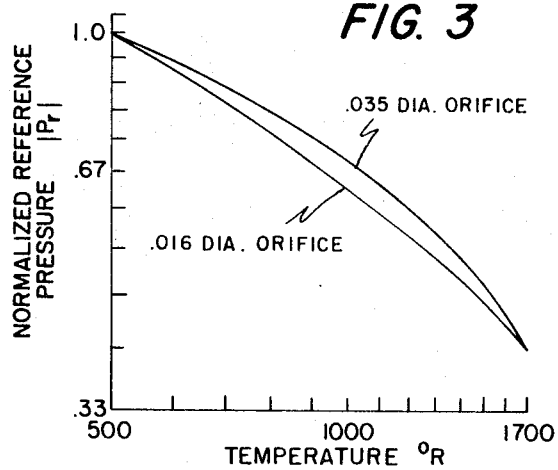
FIG. 3 is a log-log graphical representation of a family of curves illustrating the variation of reference pressure with absolute temperature for various downstream orifice restrictors.

The effect on the temperature sensitivity of reference pressure $P_r$ produced by varying the size of the orifice diameter of orifice restrictor 11b is illustrated in the family of curves of FIG. 3. The curves were obtained with a constant supply pressure $P_s$ of 10 p.s.i.g. and a constant pressure drop of 8 p.s.i.g. across restrictor wherein the degree of laminarity was held constant. A single laminar restrictor was utilized with the 0.016-inch orifice, but four laminar restrictors were connected in parallel when testing the 0.035-inch orifice in order to compensate for the increased flow. The two curves plotted on log-log scales in FIG. 3 indicate that the degree of curvature of the temperature sensitivity can be more widely controllably varied by varying the orifice size of restrictor 11b as opposed to varying the laminarity of restrictor 11a whereas the curves in FIG. 2 indicate that the slope of the average temperature sensitivity can be controllably varied by varying the laminarity of restrictor 11a. Thus, there are two factors available for matching the temperature sensitivity of reference circuit 11 with that of fluidic circuit 10. These two means for controlling the temperature sensitivity of reference circuit 11 are, of course, involved in satisfying the hereinabove two conditions $K_a = K_2/K_1$ and the temperature exponent condition $x = y - 0.5$.

Figure 4:
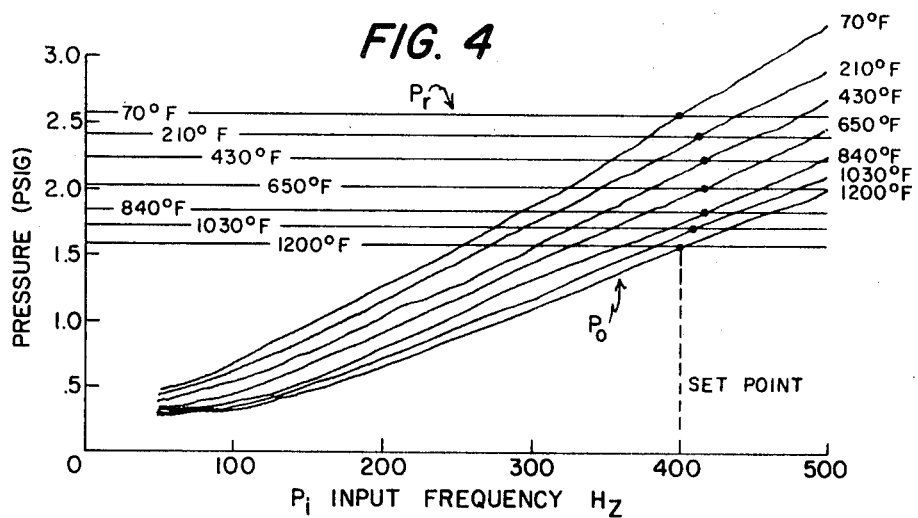
FIG. 4 is a graphical representation of the variation of a reference-operating point in a fluidic control system with temperature.

FIG. 4 is a graphical representation of the variation of the reference-operating point with temperature in the fluidic circuit illustrated in FIG. 1. Data for these curves was taken over a temperature range of 70° F. to 1,200° F. and the graph is a plot of a family of curves of reference pressure $P_r$ and controlled parameter output pressure $P_o$ in p.s.i.g. versus frequency of the input signal $P_i$ to circuit 10 generated by a variable speed pneumatic chopper wherein the frequency is directly proportional to the speed of a speed-controlled rotating machine. It can be seen that the temperature sensitivity of fluidic circuit 10 and reference circuit 11 is such that pressures $P_o$ and $P_r$ vary in a very similar manner with temperature for each particular input signal $P_i$ frequency. The points at which the signal $P_o$ curves intersect the corresponding reference pressure $P_r$ curves (shown as enlarged dots) is the reference or speed set point about which the machine speed operates. The data on FIG. 4 indicates that over the temperature range of 70° F. to 1,200° F. the speed set point varies a maximum of ±2 percent. The curves shown in FIG. 4 were obtained by using three parallel somewhat laminar restrictors 11a each having dimensions of 0.010×0.010×0.600-inch long, and restrictor 11b was an orifice of 0.021-inch diameter. The three parallel restrictors were employed to obtain a required pneumatic flow to the control port of the error-sensing circuit amplifier 12. It is believed that further optimization can be obtained by varying the orifice size to more closely adjust the temperature sensitivity of the speed set point ($P_r$) to that of pressure $P_o$ and thereby obtain an even higher accuracy or match of the $P_o$ and $P_r$ curves. It has also been determined that there is a supply pressure sensitivity wherein a variation in supply pressure $P_s$ causes a change in the speed set point for a given temperature, however, tests conducted with the circuit of FIG. 1 indicate that for the worst case, a 5 percent supply pressure change causes a variation in speed set point of only 1 percent. This supply pressure sensitivity will therefore be neglected in the following approach for determining a more general temperature-compensating fluidic reference circuit.

Figure 5:
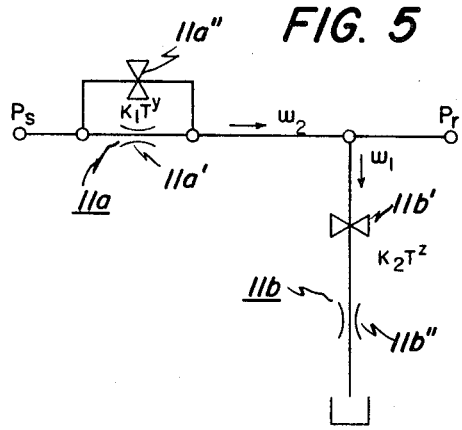
FIG. 5 is a schematic diagram of a generalized temperature-compensating fluidic reference circuit constructed in accordance with our invention.

Referring now to FIG. 5, there is shown a generalized temperature-compensating passive fluidic reference circuit constructed in accordance with our invention. This reference circuit comprised of two different restrictor networks 11a, 11b, is adapted for use with any temperature-sensitive circuit 10 having a pressure-temperature variation in the range of $K_a/T^{1.2}$ to $K_a T^{1.2}$.

It should be understood that the parallel arrangement of restrictors 11a' and 11a'' and the series arrangement of restrictors 11b' and 11b'' is merely for illustrative purposes and each network may also include only one restrictor or more than two restrictors interconnected in any manner not necessarily limited to that illustrated in FIG. 5. Thus, the network 11a may include two or more restrictors of the same or different types connected in parallel or in series, and in the case of a parallel connection, additional restrictors may be connected in series with the parallel arrangement. In like manner, network 11b is not limited to a series connection and may include one or more restrictors connected in various series, and/or parallel arrangements to the vent.

The generalized connection of various restrictors in networks 11a and 11b permits the greatest degree of optimization for matching the temperature sensitivity (pressure vs. temperature) of reference pressure $P_r$ and the controlled parameter signal pressure $P_o$.

It will be assumed that the pressure drop across restrictor network 11a varies with temperature as the function $K_1 T^y \omega$ and the pressure drop across restrictor network 11b varies with temperature as the function $K_2 T^z \omega$. Restrictor network 11a is illustrated as comprising the parallel connection of a laminar-type restrictor 11a' and an orifice-type restrictor 11a''. Restrictor network 11b is comprised of a serially connected orifice restrictor 11b' and laminar-type restrictor 11b''. In both cases the laminar-type restrictors (11a' and 11b'') are not necessarily of the fully laminar type and thus their temperature exponents can be anywhere in the range from a near orifice type (i.e., ≅0.51) to 1.7 whereas the orifice-type restrictors 11a'' and 11b' are assumed to have a temperature exponent only of 0.5. It is also assumed that pressure $P_o$ varies with absolute temperature as the function $P_o/P_s = K_a / T^x$. For air and many other gases, the range of values of $x$ may be $-1.2 \leq x \leq 1.2$ and the range of values of $y$ and $z$ is $0.5 \leq y \leq 1.7$ and $0.5 \leq z \leq 1.7$ in order to satisfy the condition $x = y - z$. Thus, in the first limiting case wherein pressure $P_o$ varies with temperature as $K_a T^{1.2}$, network 11a is a pure orifice restrictor and network 11b is a purely laminar restrictor ($z = 1.7$). In the other limiting case wherein pressure $P_o$ varies with temperature as $K_a/T^{1.2}$, a network 11a is a purely laminar restrictor ($y = 1.7$) and network 11b is a pure orifice restrictor ($z = 0.5$). The two limiting cases require the use of only single-type restrictors in networks 11a and 11b since the values $x = \pm 1.2$ can only be obtained from the difference of values $y$ (or $z$) = 1.7 and $z$ (or $y$) = 0.5. The condition $K_a = K_2/K_1$ must, of course, also be satisfied to obtain a temperature-insensitive reference pressure $P_r$, and such condition may narrow the ranges of $x$, $y$ and $z$ in some cases.

The primary purpose for utilizing a parallel or series arrangement of two different type restrictors in networks 11a and, or 11b as illustrated in FIG. 5 is to achieve the required pressure level, $P_r$, and shaping of the characteristic pressure level, $P_r$, and shaping of the characteristic pressure vs. temperature curves (i.e., the temperature sensitivity) of the reference circuit to match the temperature sensitivity of $P_o$. Single-type restrictors in networks 11a, 11b often can be designed to obtain desired pressure vs. temperature relationships at the two extreme temperatures of the temperature range over which operation is anticipated, however, at intermediate temperatures these characteristics may vary considerably from the temperature sensitivity characteristics of the fluidic circuit 10 being compensated thereby. Although the temperature exponent of 1.7 for a fully laminar restrictor has been calculated for air, this 1.7 exponent is also valid for many other gases since such other gases as oxygen, nitrogen, carbon dioxide and hydrogen also have a viscosity temperature exponent of substantially 0.7.

From the hereinabove description, it can be appreciated that our invention achieves the objectives set forth in that it provides a temperature-compensating fluidic reference circuit having a temperature sensitivity closely approximating that of another fluidic circuit to thereby obtain accurate operation of the fluidic system including such circuits. Accuracy of tracking of the two temperature sensitivities within ±2 percent over a temperature range of at least 1,200° F. is readily obtained, and is not a limitation of the tracking accuracy that can be attained. As a result, the pressures of the two circuits vary with temperature in the same manner whereby system operation about the reference point is temperature insensitive. The resulting simplification of our invention in utilizing passive fluid flow restrictor networks in place of the prior art parallel network including a torsional reed and frequency-to-analog converter circuit in one embodiment is important both economically (in money and space occupied by the circuits) and in providing a higher accuracy of control since no frequency-generating elements are utilized.

Although the embodiment of our invention described above relates to gases having a viscosity temperature exponent of 0.7, our invention is not limited to such gases. Thus, gases having viscosity temperature exponents of 0.8, 0.6 and 0.5, etc. can be utilized and result in temperature exponents of 1.8, 1.6 and 1.5, etc. respectively, for a fully laminar restrictor.

What we claim as new and desire to secure by Letters Patent of the United States is:

1. In an improved temperature-compensated control system comprising a temperature-sensitive fluidic circuit wherein the pressure signal $P_o$ at the output thereof is proportional to the magnitude of the system controlled parameter and varies with absolute temperature $T$ as the function $P_o/P_s = K_a/T^x$ where $P_s$ is the pneumatic supply pressure to the temperature-sensitive circuit and $K_a$ is a constant gain factor, the improvement consisting of a temperature-compensating passive fluidic reference circuit comprising at least a first fluid flow restrictor connected at an input end thereof to the pneumatic supply pressure $P_s$ and providing a reference pressure $P_r$ at the output end thereof, said first restrictor obtaining a pressure drop thereacross varying with absolute temperature as the function $P_s-P_r=K_1T^y\omega$, and at least a second fluid flow restrictor connected at an input end thereof to the output end of said first resistor and being vented at an output end thereof, said second restrictor obtaining a pressure drop thereacross varying with absolute temperature as the function $P_r=K_2T^z\omega$ where $K_1$ and $K_2$ are respective flow resistance coefficients of said first and second restrictors, and $\omega$ is the weight flow rate of the pneumatic medium therethrough, the pressure signal $P_o$ and reference pressure $P_r$ varying with temperature in the same manner for the conditions $x=y-Z$ and $K_2/K_1=K_a$ whereby operation of the temperature-sensitive fluidic circuit and the reference fluidic circuit about a reference point defined by $P_o=P_r$ is made insensitive to temperature changes.

2. In the temperature-compensated control system set forth in claim 1 wherein the temperature exponents are in the range
$-1.2 \leq x \leq 1.2$, $0.5 \leq y \leq 1.7$, and $0.5 \leq z \leq 1.7$
wherein a value of 0.5 defines a pure orifice restrictor and a value of 1.7 defines a fully laminar restrictor.

3. In the temperature-compensated control system set forth in claim 1 wherein said at least first fluid flow restrictor consists of a first network of different type restrictors interconnected to obtain a desired value of $K_1$ and $y$, and said at least second fluid flow restrictor consists of a second network of different type restrictors interconnected to obtain a desired value of $K_2$ and $z$.

4. In the temperature-compensated control system set forth in claim 1 wherein the pressure signal $P_o$ varies with absolute temperature as the function $$P_o/P_s = K_a/T^{0.5},$$

the temperature exponent of the pressure drop across said at least first fluid flow restrictor is in the range $1.0 \leq y \leq 1.7$, and the temperature exponent of the pressure drop across said at least second fluid flow restrictor is in the range $0.5 \leq z \leq 1.2$.

5. In the temperature-compensated control system set forth in claim 4 wherein said at least first fluid flow restrictor is of a partially laminar type to obtain a pressure drop thereacross varying with absolute temperature as the function $P_s-P_r=K_1T^{1.0}\omega$, and said at least second fluid flow restrictor is an orifice type to obtain a pressure drop thereacross varying with absolute temperature as the function $P_r=K_2T^{0.5}\omega$.

6. In the temperature-compensated control system set forth in claim 5 wherein said at least first fluid flow restrictor is a single restrictor, and said at least second fluid flow restrictor is a single restrictor.

7. In the temperature-compensated control system set forth in claim 5 wherein said at least first fluid flow restrictor is a plurality of parallel connected first restrictors each of an identical partially laminar type to obtain a pressure drop thereacross varying with absolute temperature as the function $P_s-P_r=K_1T^{1.0}\omega$, the number of first restrictors determined by the pneumatic flow required at the output end thereof, and said at least second fluid flow restrictor is a single restrictor of the orifice type.

8. A passive fluidic reference circuit for developing a reference pressure having a desired variation $K_a/T^x$ with absolute temperature comprising a first fluid flow restrictor connected at an input end thereof to a pneumatic supply pressure $P_s$ and providing a reference pressure $P_r$ at the output end thereof, said first restrictor having a ratio of length to hydraulic diameter for obtaining a pressure drop thereacross varying with absolute temperature $T$ as the function $P_s-P_r=K_1T^y\omega$, and a second fluid flow restrictor connected at an input end thereof to the output end of said first restrictor and being vented at an output end, said second restrictor having a ratio of length to hydraulic diameter for obtaining a pressure drop thereacross varying with absolute temperature as the function $P_r=K_2T^z\omega$, the expression $K_1/K_2 \, T(y-z)$ being much greater than unity to thereby produce a desired variation of reference pressure with temperature for said passive fluidic circuit the approximation $P_r/P_s \cong K_a/T^x$ where $K_a=K_2/K_1$ and $x=y-z$.

9. The passive fluidic reference circuit set forth in claim 8 wherein the temperature exponent of the pressure drop across said first fluid flow restrictor is in the range $0.5 \leq y \leq 1.7$, and the temperature exponent of the pressure drop across said second fluid flow restrictor is in the range of $0.5 \leq z \leq 1.7$ wherein a value of 0.5 defines an orifice restrictor and a value of 1.7 defines a fully laminar restrictor.

10. The passive fluidic circuit set forth in claim 9 wherein said first fluid flow restrictor is of a partially laminar type for obtaining a pressure drop thereacross varying with absolute temperature as the function $P_s-P_r=K_1T^{1.0}\omega$, and said second fluid flow restrictor is of the orifice type for obtaining a pressure thereacross varying with absolute temperature as the function $p_r=k_2T^{0.5}\omega$.